US008009767B2

(12) United States Patent
Kaiki (10) Patent No.: US 8,009,767 B2
(45) Date of Patent: Aug. 30, 2011

(54) DIGITAL DEMODULATING APPARATUS, DIGITAL RECEIVER, CONTROLLING METHOD OF THE APPARATUS, COMPUTER PROGRAM PRODUCT FOR THE APPARATUS, AND RECORDING MEDIUM RECORDING THEREON THE PRODUCT

(75) Inventor: Nobuyoshi Kaiki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 883 days.

(21) Appl. No.: 11/600,800

(22) Filed: Nov. 17, 2006

(65) Prior Publication Data

US 2007/0121491 A1    May 31, 2007

(30) Foreign Application Priority Data

Nov. 25, 2005    (JP) .................................. 2005-340126

(51) Int. Cl.
*H04L 27/06*    (2006.01)
(52) U.S. Cl. ........................ 375/340; 375/316
(58) Field of Classification Search .................... 375/316
See application file for complete search history.

(56) References Cited

U.S. PATENT DOCUMENTS

| | | | | | |
|---|---|---|---|---|---|
| 4,637,022 | A | * | 1/1987 | Burke et al. | 714/784 |
| 4,672,632 | A | * | 6/1987 | Andersen | 375/284 |
| 4,684,941 | A | * | 8/1987 | Smith et al. | 340/825.52 |
| 4,802,008 | A | * | 1/1989 | Walling | 725/67 |
| 5,404,161 | A | * | 4/1995 | Douglass et al. | 725/15 |
| 5,485,545 | A | * | 1/1996 | Kojima et al. | 706/23 |
| 5,692,016 | A | * | 11/1997 | Vanselow | 375/344 |
| 5,715,521 | A | * | 2/1998 | Fukasawa et al. | 455/69 |
| 5,727,028 | A | * | 3/1998 | Ghosh et al. | 375/340 |
| 5,896,374 | A | * | 4/1999 | Okumura et al. | 370/311 |
| 5,930,230 | A | * | 7/1999 | Odenwalder et al. | 370/208 |
| 6,278,864 | B1 | * | 8/2001 | Cummins et al. | 455/73 |
| 6,411,646 | B1 | * | 6/2002 | Walley et al. | 375/146 |
| 6,651,211 | B1 | * | 11/2003 | Abe et al. | 714/762 |
| 6,707,806 | B1 | * | 3/2004 | Kato | 370/336 |
| 6,862,313 | B2 | * | 3/2005 | Walley et al. | 375/141 |
| 6,865,216 | B1 | * | 3/2005 | Beamish et al. | 375/140 |
| 6,950,474 | B1 | * | 9/2005 | Sudo | 375/260 |
| 7,035,326 | B1 | * | 4/2006 | Heidari et al. | 375/229 |
| 7,292,553 | B2 | * | 11/2007 | Tiedemann et al. | 370/335 |
| 7,330,707 | B2 | * | 2/2008 | Okanobu | 455/140 |
| 7,529,315 | B2 | * | 5/2009 | Sudo | 375/295 |
| 2002/0069417 | A1 | * | 6/2002 | Kliger et al. | 725/78 |
| 2002/0159426 | A1 | * | 10/2002 | Kanemoto et al. | 370/342 |

(Continued)

FOREIGN PATENT DOCUMENTS

JP    2001-251275 A    9/2001

(Continued)

*Primary Examiner* — Chieh M Fan
*Assistant Examiner* — Santiago Garcia
(74) *Attorney, Agent, or Firm* — Birch, Stewart, Kolasch & Birch, LLP (57) ABSTRACT

A digital demodulating apparatus is provided capable of more reducing the power consumption of a demodulator by decreasing the performance of demodulation processing to a portion of a signal in which the signal condition is forecasted to be worsened. In the apparatus, when a signal status forecasting section has forecasted that the status of the received signal is worsened to a predetermined status due to a predetermined control of a controller, a demodulation controller controls an operation of at least one of circuit elements constituting the demodulator such that the performance of the operation decreases, in processing the portion where the signal status is worsened.

18 Claims, 7 Drawing Sheets

U.S. PATENT DOCUMENTS

| | | | |
|---|---|---|---|
| 2003/0012260 A1* | 1/2003 | Walley et al. | 375/146 |
| 2003/0014709 A1* | 1/2003 | Miyoshi et al. | 714/758 |
| 2003/0190903 A1* | 10/2003 | Melamed | 455/277.1 |
| 2005/0135501 A1* | 6/2005 | Chang et al. | 375/295 |
| 2006/0019623 A1* | 1/2006 | Song | 455/190.1 |
| 2006/0215590 A1* | 9/2006 | Sharma et al. | 370/311 |
| 2007/0116136 A1* | 5/2007 | Kaiki | 375/259 |
| 2007/0118788 A1* | 5/2007 | Kaiki | 714/755 |
| 2007/0121491 A1* | 5/2007 | Kaiki | 370/222 |
| 2007/0130605 A1* | 6/2007 | Chung | 725/131 |
| 2007/0242599 A1* | 10/2007 | Gorday et al. | 370/208 |
| 2007/0275680 A1* | 11/2007 | Kaiki et al. | 455/184.1 |
| 2009/0041158 A1* | 2/2009 | Sakai et al. | 375/316 |
| 2009/0042527 A1* | 2/2009 | Niknejad | 455/234.2 |
| 2009/0075614 A1* | 3/2009 | Lin et al. | 455/240.1 |
| 2009/0086858 A1* | 4/2009 | Kaiki | 375/345 |

FOREIGN PATENT DOCUMENTS

JP  2004-32467 A  1/2004

* cited by examiner

DIGITAL DEMODULATING APPARATUS, DIGITAL RECEIVER, CONTROLLING METHOD OF THE APPARATUS, COMPUTER PROGRAM PRODUCT FOR THE APPARATUS, AND RECORDING MEDIUM RECORDING THEREON THE PRODUCT

BACKGROUND OF THE INVENTION

1. Field of the Invention

The present invention relates to a digital demodulating technique for receiving and demodulating a modulated signal transmitted from a digital transmitting apparatus.

2. Description of Related Art

In recent years, as a digital demodulating apparatus that receives and demodulates a modulated signal transmitted from a digital transmitting apparatus, a digital demodulating apparatus is proposed that can realize a decrease in power consumption. For example, JP-A-2001-251275 discloses a digital demodulating apparatus that can realize a decrease in power consumption by turning the power of each circuit element constituting a tuner and a demodulator on/off for a proper time.

When the power of a circuit element constituting a tuner or a demodulator is controlled, it may cause generation of noise in a received signal to worsen the status of the signal though it is dependent on factors such as a control timing and a control time period. In such a case, for example, in the case that a portion of the received signal has been completely broken and thus data can not be taken out from the portion, it is useless that the demodulator performs the same demodulation processing as in the case of the normal status of the signal, to the portion where the signal status has been worsened. This brings about extra power consumption for the useless processing.

SUMMARY OF THE INVENTION

An object of the present invention is to provide a digital demodulating technique that makes it possible to decrease more the power consumption of a demodulator by lowering the performance of demodulating processing to a portion a signal where the status of the signal is expected to be worsened.

A digital demodulating apparatus according to the present invention comprises a tuner that performs channel select processing to a received signal; a demodulator that performs demodulation processing to the received signal from the tuner; a controller that controls the tuner and the demodulator; a signal status forecasting section that forecasts a signal status of the received signal when it is assumed that the controller performs a predetermined control; and an operation controlling section that controls an operation of at least one of a plurality of circuit elements that constitute the demodulator, such that a performance of the operation of the circuit element decreases in processing a portion in which the signal status is worsened, when the signal status forecasting section has forecasted that the signal status of the received signal is worsened to a predetermined status due to the control of the controller.

According to the above feature, when the signal status forecasting section has forecasted that the status of the received signal is worsened due to the predetermined control of the controller, the operation controlling section controls a circuit element that constitutes the demodulator, such that the performance of the operation of the element decreases. When the status of a portion of the received signal has been worsened due to the control of the controller to a degree in which data can not been taken out from the portion, it is useless that the same demodulation processing as for the normal portion is performed to the portion in which the signal status has been worsened. Thus, by decreasing the performance of the demodulation processing to the portion in which the signal status has been worsened, the power consumption of the demodulator can be reduced. In the below description, a "circuit element" is not limited to a circuit that constitutes each part of the demodulator. The "circuit element" can correspond to any unit of part, for example, a part equivalent to one transistor that constitutes a circuit.

The digital demodulating apparatus according to the present invention may comprise a CN ratio estimating section that estimates a CN ratio of the received signal when it is assumed that the controller performs the predetermined control, and the signal status forecasting section may decide that the signal status of the received signal is worsened to the predetermined status, when the CN ratio estimated by the CN ratio estimating section is not more than a predetermined threshold. According to this feature, when the CN ratio estimated when it is assumed that the controller performs the predetermined control is less than the predetermined threshold, it is decided that the signal status of the receive signal is worsened, and the operation of the circuit element that constitutes the demodulator is controlled so as to decrease the performance of the operation.

In the digital demodulating apparatus according to the present invention, the demodulator comprises an AD converting section that converts the received signal, which is an analogue signal, into a digital signal, and the operation controlling section controls an operation of the AD converting section by decreasing an electric power to be supplied to the AD converting section. According to this feature, when the status of the received signal has been worsened, the electric power to be supplied to the AD converting section is decreased in processing the portion where the status has been worsened. Thus, the power consumption of the demodulator is decreased.

In the digital demodulating apparatus according to the present invention, the operation controlling section may decrease the electric power so as to decrease a resolution of the AD converting section, or so as to decrease a sampling frequency of the AD converting section.

In the digital demodulating apparatus according to the present invention, the demodulator comprises an AD converting section that converts the received signal, which is an analogue signal, into a digital signal, and a plurality of digital circuits that process digital signals from the AD converting section, and the operation controlling section stops processing to the received signal in at least one of the plurality of digital circuits in a unit of symbol in which the signal status forecasting section has forecasted that the signal status is worsened. According to this feature, when the status of the received signal has been worsened, processing in at least one of the digital circuits is stopped to decrease the quantity of operation and so on. This decreases the power consumption of the demodulator.

In the digital demodulating apparatus according to the present invention, the operation controlling section may stop processing to the received signal in one of a symbol synchronizing section, an FFT section, a frame synchronizing section, a detection section, a wave equalizing section, and a frequency deinterleaving section.

In the digital demodulating apparatus according to the present invention, the received signal has been interleaved, and the apparatus comprises an error correcting section that performs deinterleaving processing to the interleaved received signal, and corrects errors included in the deinterleaved received signal. According to this feature, even when errors have increased in the received signal due to the predetermined control of the controller and thereby the status of the signal has been worsened, the error correcting section corrects the errors in the received signal after the errors are dispersed by deinterleave processing. This makes it possible to obtain accurate data.

In the digital demodulating apparatus according to the present invention, the error correcting section comprises a time deinterleaving section that performs time deinterleave processing to the received signal, and the apparatus comprises a dummy signal generating section that outputs a dummy signal to the time deinterleaving section in place of the received signal when processing to the received signal is stopped in at least one of the plurality of digital circuits, in a unit of symbol in which the signal status forecasting section has forecasted that the signal status is worsened. When processing in a digital circuit after the AD converting section is stopped, data is not output to the time deinterleaving section during stopping the processing, and normal time deinterleave processing can not be performed. According to the present invention, however, because a dummy signal is input to the time deinterleaving section in place of the received signal when the processing in the digital circuit is stopped due to worsening of the status of the received signal, time deinterleave processing can be properly performed.

In the digital demodulating apparatus according to the present invention, the error correcting section changes its error correction performance on the basis of a reliability of the input signal. According to this feature, the error correction performance can be properly set on the basis of the reliability of the signal to be input.

In the digital demodulating apparatus according to the present invention, the dummy signal generating section may set the reliability of the dummy signal to a lowest value. According to this feature, when the dummy signal is input to the error correcting section, the input signal is always judged to be in error, so that the error correction performance is improved.

In the digital demodulating apparatus according to the present invention, the error correcting section may comprise a decoder that decodes the received signal that has been encoded by convolution coding. According to this feature, by the decoder decoding the received signal that has been encoded by convolution coding, errors included in the received signal can be corrected.

In the digital demodulating apparatus according to the present invention, the decoder may change a trace back length on the basis of the reliability of the input signal. The convolution coding method is a method of coding from the history of data of the past. Thus, in the decoder that decodes a signal having been encoded by the convolution coding, the error correction performance is more improved as the trace back length, which is the length to be referred to with tracing back, is longer. Thus, according to the present invention, when the reliability of the input signal is high, i.e., the signal status is good, the quantity of operation of decode processing and so on can be decreased to reduce the power consumption by shortening the trace back length. Contrastingly, when the reliability of the input signal is low, i.e., the signal status is bad, errors can be corrected more surely by increasing the trace back length.

In the digital demodulating apparatus according to the present invention, the decoder may be able to select one of a first decoding mode in which decoding is performed without reflecting the reliability of the input signal, and a second decoding mode in which decoding is performed with reflecting the reliability, and the decoder may switch its mode between the two decoding modes on the basis of the reliability. According to this feature, when the reliability of the input signal is high, i.e., the signal status is good, the quantity of operation of decode processing can be decreased to reduce the power consumption by selecting the first decoding mode to perform decode processing without reflecting the reliability of the signal. Contrastingly, when the reliability of the input signal is low, i.e., the signal status is bad, errors can be corrected more surely by selecting the second decoding mode to perform decode processing with reflecting the reliability.

The digital demodulating apparatus as described above can be adopted in various digital receivers such as cellular phones and digital television receivers, which performs reproduction processing for at least one of character data, image data, audio data, and program data. Such a receiver obtains information on character data, image data, audio data, or program data, from the received signal demodulated by the digital demodulating apparatus of the present invention, and then performs reproduction processing to the data.

A digital receiver according to the present invention may comprise a digital demodulating apparatus comprising a tuner that performs channel select processing to a received signal, and a demodulator that performs demodulation processing to the received signal from the tuner. The receiver may further comprise a controller that controls the whole of the receiver including the digital demodulating apparatus, a signal status forecasting section that forecasts a signal status of the received signal when it is assumed that the controller performs a predetermined control; and an operation controlling section that controls an operation of at least one of a plurality of circuit elements that constitute the demodulator, such that a performance of the operation of the circuit element decreases in processing a portion in which the signal status is worsened, when the signal status forecasting section has forecasted that the signal status of the received signal is worsened to a predetermined status due to the control of the controller.

Even when the controller that controls the whole of the receiver performs a control, noise may be generated in the received signal to worsen the signal status. For this reason, according to the present invention, when it is forecasted that the signal status of the received signal is worsened due to a predetermined control of the controller, the operation controlling section controls an operation of a circuit element that constitutes the demodulator, such that the performance of the operation of the element decreases, so as to decrease the power consumption of the demodulator.

A controlling method according to the present invention is for a digital demodulating apparatus comprising a tuner that performs channel select processing to a received signal; a demodulator that performs demodulation processing to the received signal from the tuner; and a controller that controls the tuner and the demodulator. The method comprises a signal status forecasting step of forecasting a signal status of the received signal when it is assumed that the controller performs a predetermined control; and an operation controlling step of controlling an operation of at least one of a plurality of circuit elements that constitute the demodulator, such that a performance of the operation of the circuit element decreases in processing a portion in which the signal status is worsened, when it was forecasted in the signal status forecasting step that the signal status of the received signal is worsened to a predetermined status due to the control of the controller.

According to the controlling method, when it is forecasted that the status of the received signal is worsened due to a predetermined control of the controller, in operation controlling step, an operation of a circuit element that constitutes the demodulator is controlled, such that the performance of the operation of the element decreases. This makes it possible to reduce the power consumption of the demodulator.

A computer program product according to the present invention is for a digital demodulating apparatus comprising a tuner that performs channel select processing to a received signal; a demodulator that performs demodulation processing to the received signal from the tuner; and a controller that controls the tuner and the demodulator. The product causes the digital demodulating apparatus to execute a signal status forecasting step of forecasting a signal status of the received signal when it is assumed that the controller performs a predetermined control; and an operation controlling step of controlling an operation of at least one of a plurality of circuit elements that constitute the demodulator, such that a performance of the operation of the circuit element decreases in processing a portion in which the signal status is worsened, when it was forecasted in the signal status forecasting step that the signal status of the received signal is worsened to a predetermined status due to the control of the controller.

According to the computer program product, when it is forecasted that the status of the received signal is worsened due to a predetermined control of the controller, in operation controlling step, an operation of a circuit element that constitutes the demodulator is controlled, such that the performance of the operation of the element decreases. This makes it possible to reduce the power consumption of the demodulator.

A recording medium according to the present invention records thereon the computer program product. According to this feature, the power consumption of the demodulator can be reduced.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
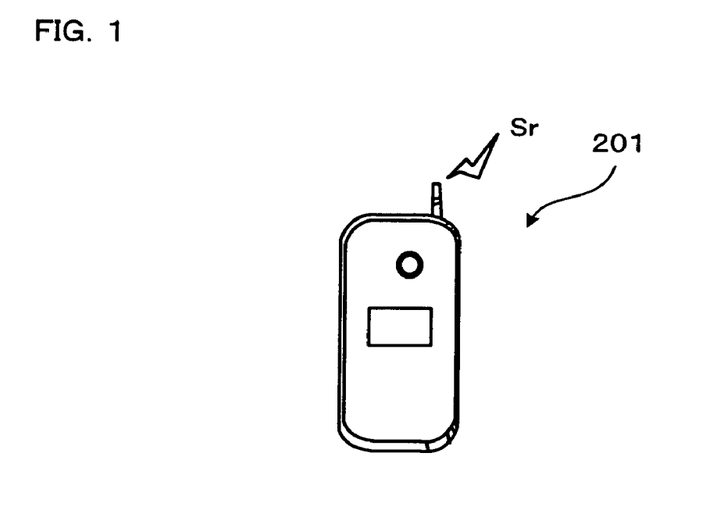
FIG. 1 is an external view of a cellular phone as an example of a digital receiver according to an embodiment of the present invention.

An embodiment of the present invention will be described with reference to the accompanying drawings. A digital demodulating apparatus 1 of the embodiment is provided in, for example, a cellular phone 201, as a digital receiver, as shown in FIG. 1. A signal Sr received by the cellular phone 201 through its antenna is demodulated by the digital demodulating apparatus 1. Character data, image data, audio data, or program data is reproduced from the demodulated signal. The information is provided to a user of the cellular phone 201 through a not-shown display and a not-shown speaker provided on the phone 201. Although the digital demodulating apparatus 1 for the cellular phone is described in this embodiment by way of example, the digital demodulating apparatus 1 may be adopted in another digital receiver than such a cellular phone, for example, a digital television receiver, a wireless LAN device, or a personal computer using wireless LAN.

Next, the signal Sr to be received by the cellular phone 201 through its antenna and demodulated by the digital demodulating apparatus 1 will be described briefly. In this embodiment, a case will be described by way of example wherein a transmission system according to Japanese digital terrestrial broadcasting, that is, the integrated services digital broadcasting-terrestrial (ISDB-T) system, is adopted.

First, data of characters, images, sounds, and programs to be transmitted is digitalized by respective predetermined methods. Further, codes are added to the digitalized data in order that errors generated due to noises and interference waves that arose in the transmission path can be corrected on the reception side. For the codes used are Reed-Solomon (RS) coding and convolution coding. In the RS coding used in digital terrestrial broadcasting, the later 16 bytes of the data of 204 bytes to be transmitted serve as check bits, and an error of eight bytes of 204 bytes can be corrected at the maximum. On the other hand, for the convolution coding, Viterbi coding is used, in which the coding rate k/n is standardized to ½ to ⅞ where n represents the number of bits of encoded data to be transmitted and k represents the number of bits of data before encoding. The digital demodulating apparatus 1 on the reception side performs RS decoding and Viterbi decoding to restore data coded by RS coding and Viterbi coding, and thereby errors generated in transmission and so on are corrected.

Figure 6:
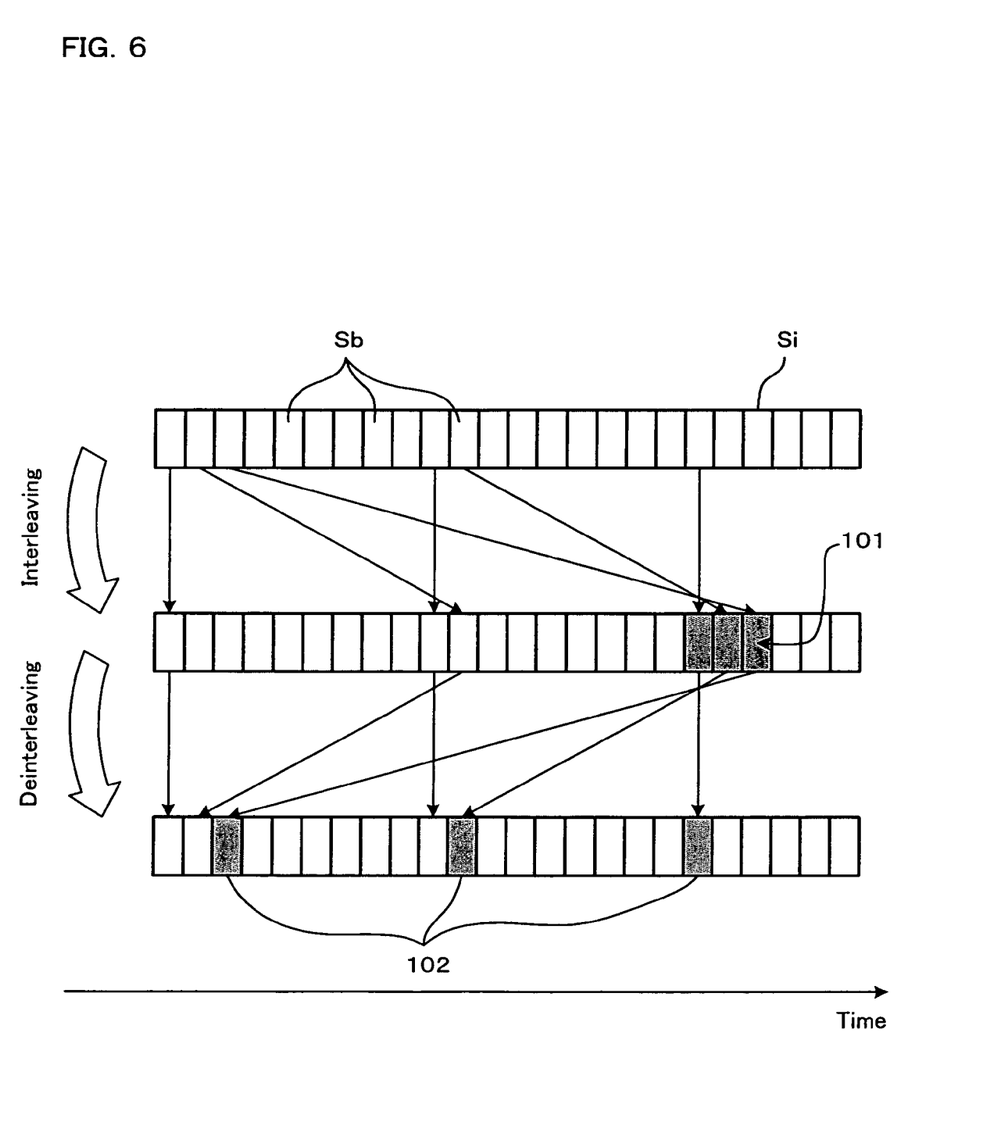
FIG. 6 is a representation for explaining time interleaving and time deinterleaving.

In accordance with conditions of a transmission path, there is a case wherein burst error arises in which errors continuously concentrate temporally or in frequency in a transmitted signal. In the case that errors generated in a signal of a certain length are to be corrected by an error correction method for RS coding as described above, there is a limit in the number of errors that can be corrected in the signal of the length. Therefore, if the burst error as described above arises, there may be a case wherein error correction is impossible. On the other hand, in the case of Viterbi decoding, if errors exist in data before decoding, there may be a case wherein incorrect code correction is performed to increase rather than decrease continuous errors. For this reason, in the ISDB-T system, various kinds of interleave processing in which data to be transmitted is rearranged temporally or in frequency are performed on the transmission side in order to make it possible to correct errors even when burst error arises in the transmitted signal. Deinterleave processing is performed on the reception side to restore the data, and thereby the burst error generated in transmission is discretely dispersed, as shown in FIG. 6. The interleave and deinterleave processing will be described later in detail.

Further, energy dispersal processing is performed to prevent energy bias in a transmitted signal due to data bias. The energy dispersal processing is performed by implementing an exclusive OR operation in unit of bit between pseudorandom data and data according to the transmitted signal to make data random.

Data is transmitted after various kinds of processing as described above. As the transmission method for the ISDB-T system, the orthogonal frequency division multiplexing (OFDM) method is adopted. The OFDM method is a kind of a multicarrier method in which a plurality of carrier waves different in frequency are used for data transmission.

First, in accordance with the order of arrangement of a plurality of data values included in data to be transmitted, the data values are allotted to the respective carrier waves different in frequency. Next, by implementing the inverse fast Fourier transform (IFFT) to the data value string allotted to the plurality of carrier waves different in frequency, the plurality of carrier waves are superimposed to form an OFDM signal. The waveforms of the carrier waves used in the OFDM method are orthogonal to each other to prevent interference between carrier waves. The term "two waves are orthogonal" means that the value is zero when the functions each representing the amplitude of the wave to time are multiplied by each other and then temporally integrated in an integration region corresponding to one cycle, that is, the inner product of the functions is zero.

In order to eliminate affection of delayed waves other than a direct wave, a guard interval is inserted in the OFDM signal in which a plurality of modulated carrier waves are superimposed. The guard interval is made in the manner that one end of a signal of each effective symbol length of the OFDM signal is copied and inserted to the other end of the signal of the effective symbol length. The effective symbol length means a period in which one data is put on one carrier wave, and it corresponds to the inverse of a frequency separation of carrier waves used in the OFDM method. The OFDM signal into which the guard interval has been inserted, is transmitted to the transmission path.

In the above example, the received signal Sr is a signal to be transmitted according to the ISDB-T system. However, other than the ISDB-T system, the signal may be transmitted according to the digital audio broadcasting (DAB) system, the digital video broadcasting-terrestrial (DVB-T) system, or the digital video broadcasting-handheld (DVB-H) system in Europe; the digital multimedia broadcasting (DMB) system in Korea; or the IEEE802.11a/b/g/n system used for a wireless LAN.

Figure 2:
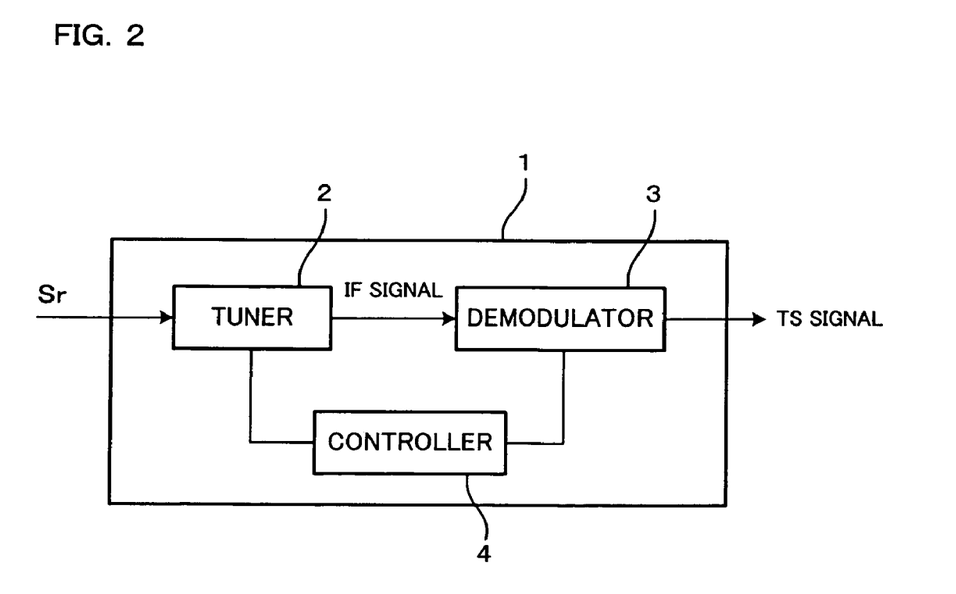
FIG. 2 is a block diagram showing a general construction of a digital demodulating apparatus according to the embodiment of the present invention.

Next, the digital demodulating apparatus 1 that demodulates the above-described signal Sr received through the antenna will be described in detail. As shown in FIG. 2, the digital demodulating apparatus 1 includes therein a tuner 2, a demodulator 3, and a controller 4. The tuner 2 receives the signal Sr through the antenna of the cellular phone 201 as shown in FIG. 1; amplifies the signal Sr; converts the signal Sr into an intermediate frequency (IF) signal Si; and then sends the IF signal Si to the demodulator 3. The demodulator 3 receives the IF signal Si from the tuner 2, and generates a demodulated signal, for example, a transport stream (TS) signal, from the IF signal Si. The controller 4 controls the operations of the tuner 2 and the demodulator 3.

Figure 3:
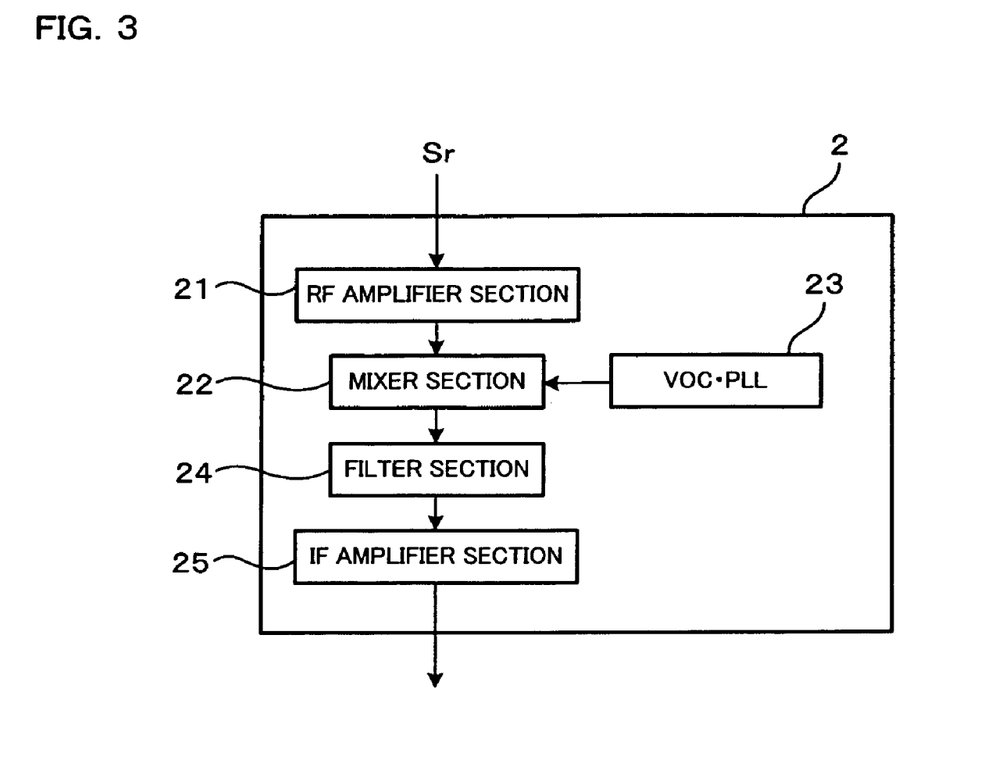
FIG. 3 is a block diagram showing a construction of a tuner shown in FIG. 2.

First, the tuner 2 will be described. As shown in FIG. 3, the tuner 2 includes therein an RF amplifier section 21, a mixer section 22, a VCO-PLL section 23, a filter section 24, and an IF amplifier section 25. The signal Sr received by the tuner 2 is amplified by the RF amplifier section 21, and then sent to the mixer section 22. In accordance with a channel control signal sent from the controller 4, the VCO-PLL section 23 generates a mixing signal based on a frequency corresponding to a specific channel.

The mixing signal is sent to the mixer section 22, in which the mixing signal is mixed to the signal Sr. The filter section 24 removes signal components of unnecessary frequency from the mixed signal to generate an IF signal corresponding to a selected channel. The processing as described above is channel select processing. The IF signal is amplified by the IF amplifier section 25, and the obtained IF signal Si is sent to the demodulator 3.

Figure 4:
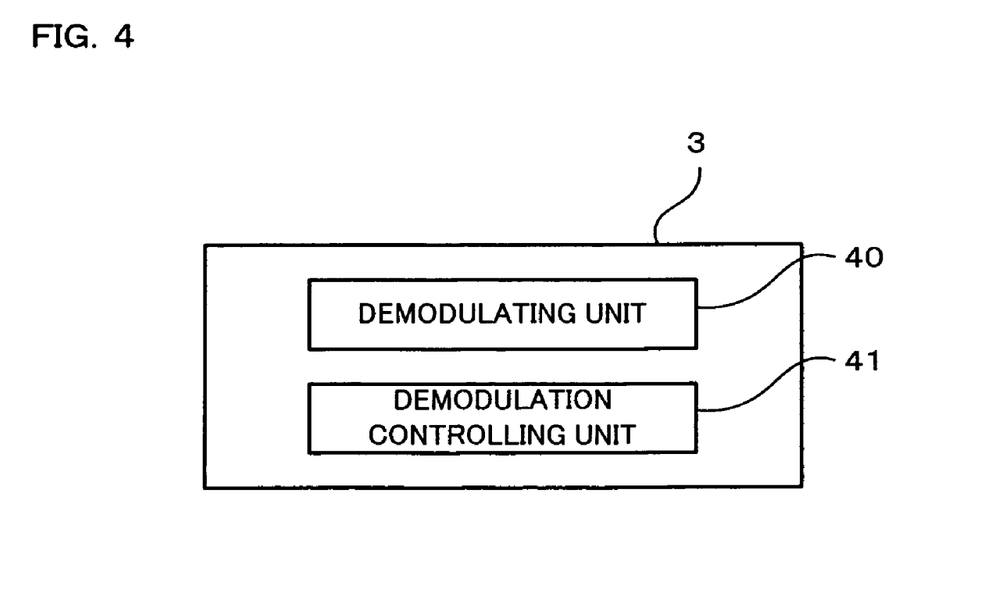
FIG. 4 is a block diagram showing a construction of a demodulator shown in FIG. 2.

Next, the demodulator 3 will be described. As shown in FIG. 4, the demodulator 3 includes therein a demodulating unit 40 that performs demodulation processing to the IF signal Si from the tuner 2; and a demodulation controlling unit 41 that controls each section of the demodulating unit 40.

Figure 5:
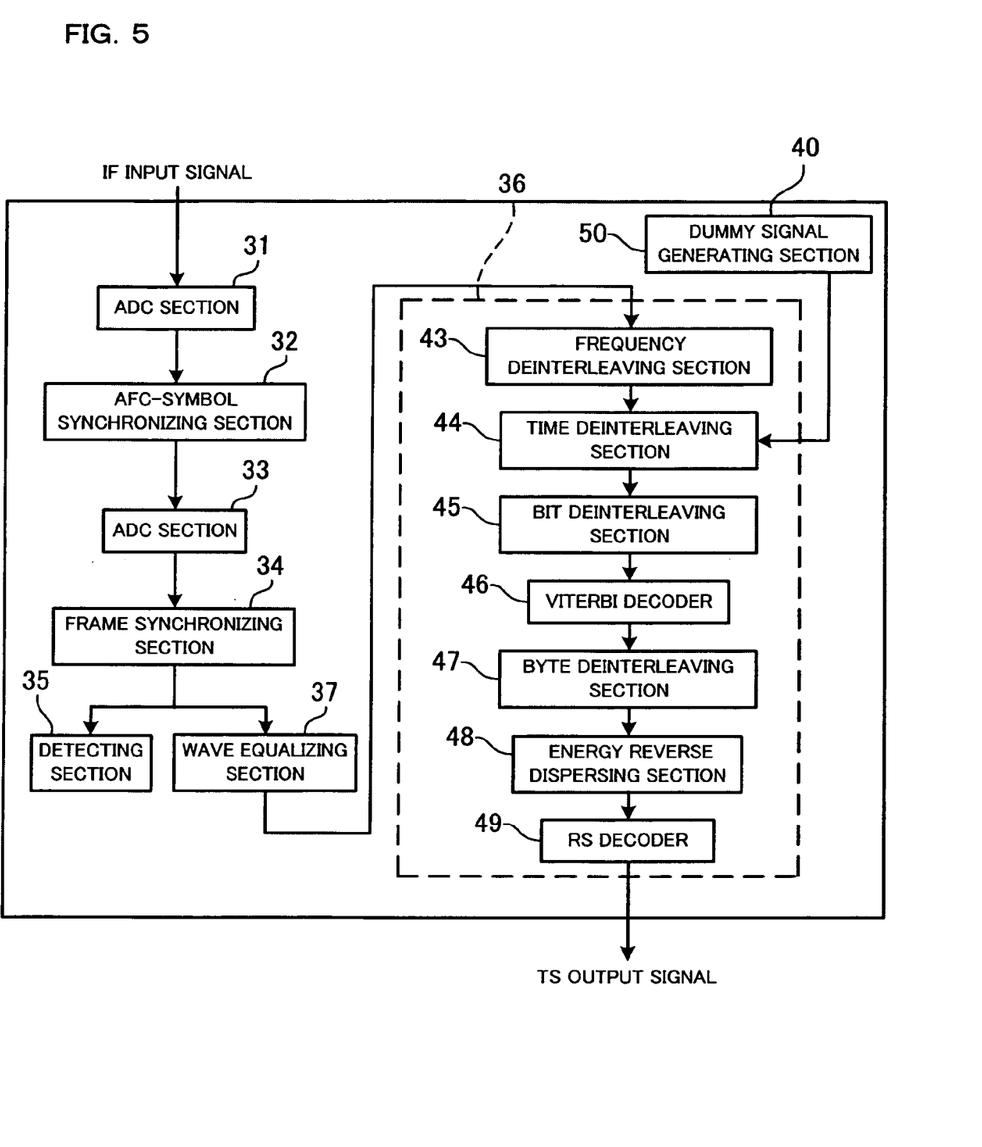
FIG. 5 is a block diagram showing a construction of a demodulating unit shown in FIG. 4.

First, the demodulating unit 40 will be described. As shown in FIG. 5, the demodulating unit 40 includes therein an ADC section 31 as an AD converting section, an AFC-symbol synchronizing section 32, a fast Fourier transform (FFT) section 33, a frame synchronizing section 34, a detecting section 35, a wave equalizing section 37, and an error correcting section 36. The demodulating unit 40 performs demodulation processing and error correction processing to an IF signal Si sent from the tuner 2.

The IF signal Si sent from the tuner 2 is input to the ADC section 31. The ADC section 31 converts the analogue IF signal into a digital signal, and sends the converted digital signal to the AFC-symbol synchronizing section 32. The AFC-symbol synchronizing section 32 performs correction processing such as filter processing to the digital signal sent from the ADC section 31. Further, the AFC-symbol synchronizing section 32 determines the start point of Fourier transform by the FFT section 33 as will be described later, that is, a symbol synchronization point. The AFC-symbol synchronizing section 32 then sends the synchronized digital signal to the FFT section 33. Further, the AFC-symbol synchronizing section 32 derives information on a mode indicating an effective symbol length, and sends the information on the mode to the controller 4. In this embodiment, modes indicating effective symbol lengths include a mode 1 of an effective symbol length of 252 microseconds, a mode 2 of an effective symbol length of 504 microseconds, and a mode 3 of an effective symbol length of 1008 microseconds.

When a symbol synchronization point is determined, a point that makes it possible to realize the most suitable reception having the least affection of a delayed wave reaching with a delay, and so on, is set to the synchronization point. As a method of determining the synchronization point, a method in which correlation of signals is referred to; a method in which phase shift is corrected by using a pilot signal; or the like, is used.

The FFT section 33 converts by Fourier transform, that is, time-frequency transform, the digital signal sent from the AFC-symbol synchronizing section 32. Because the digital signal input to the FFT section 33 is an OFDM signal, it has its waveform that has been converted by inverse Fourier transform, that is, its waveform in which a plurality of carrier waves modulated in accordance with data values are superimposed. The FFT section 33 takes out the data values of the plurality of carrier waves modulated in accordance with the data values, from the thus superimposed wave. The FFT section 33 then rearranges digital signals corresponding to the data values distributed to the respective carrier waves, so that the signals are temporally arranged in the original order of data. The FFT section 33 thereby reproduces a digital signal corresponding to data before generation of the OFDM signal. The FFT section 33 then sends the digital signal to the frame synchronizing section 34.

The frame synchronizing section 34 synchronizes the digital signal sent from the FFT section 33, in unit of frame. One frame is constituted by, for example, 204 symbols, and a batch of TMCC information is obtained from one frame signal, as will be described later. The digital signal synchronized by the frame synchronizing section 34 is sent to the wave equalizing section 37 and also to the detecting section 35.

On the basis of a scattered pilot signal or the like included in the digital signal, the wave equalizing section 37 performs wave equalization processing to the digital signal that has been synchronized by the frame synchronizing section 34. After correcting the signal by wave equalization, the wave equalizing section 37 demodulates (or demaps) the signal into a digital signal corresponding to data values, and then sends the demodulated (or demapped) digital signal to the error correcting section 36. In addition, on the basis of the scattered pilot signal or the like included in the wave-equalized digital signal, the wave equalizing section 37 derives the difference between the constellation of each carrier wave and a specified value. The wave equalizing section 37 takes out information on a modulation error ratio (MER) or a CN ratio of the received signal, from the derived difference between the constellation and the specified value. The wave equalizing section 37 then sends the MER or CN ratio to the controller 4.

The detecting section 35 takes out TMCC information included in the signal of each frame, and sends the information on TMCC to the controller 4. The TMCC information contains therein information on a transmission system such as a carrier modulation method, such as 64 QAM, 16 QAM, or QPSK; a convolution coding rate of, for example, $1/2$, $2/3$, $3/4$, $5/6$, or $7/8$; guard interval lengths; and so on. As the guard interval lengths adopted are $1/4$, $1/8$, $1/16$, and $1/32$ of the length of an effective symbol.

The error correcting section 36 includes therein deinterleaving sections 43, 44, 45, and 47 to perform deinterleave processing to the digital signal from the wave equalizing section 37; decoders 46 and 49 to perform decode processing to the digital signal; and an energy reverse dispersing section 48.

The deinterleaving sections include a frequency deinterleaving section 43, a time deinterleaving section 44, a bit deinterleaving section 45, and a byte deinterleaving section 47, which perform frequency deinterleaving, time deinterleaving, bit deinterleaving, and byte deinterleaving, respectively, to correspond to various kinds of interleave processing performed on the transmission side. The digital signal to which various kinds of interleave processing have been performed is restored by the above kinds of deinterleave processing to the digital signal before interleaving.

Here, interleave processing on the transmission side and deinterleave processing by the deinterleaving sections on the reception side will be complemented. For example, time interleaving on the transmission side and time deinterleaving on the reception side to restore the data to which the time interleaving has been performed, are performed as follows. FIG. 6 is a representation showing an example of time interleave and deinterleave processing. FIG. 6 shows three signals Si before and after interleave and deinterleave processing. Each signal Si is constituted by a plurality of symbols Sb successive temporally.

An OFDM signal Si constituted by a plurality of modulated carrier waves is rearranged by time interleave processing on the transmission side, in a predetermined order in unit of data corresponding to the length of each symbol Sb, as shown in FIG. 6. When the signal corresponding to the data thus rearranged is transmitted, a continuous burst error 101 may arise in part of the signal in accordance with conditions of the transmission path.

After the cellular phone 201 receives the signal including the burst error 101, data once rearranged by time interleave processing is restored to its original order by time deinterleave processing. By this, the burst error 101 having arisen over a plurality of symbols in the transmission path is dispersed to errors 102 of the respective symbols by time deinterleave processing.

As shown in FIG. 6, rearranging is performed by time interleave processing such that each symbol is shifted to a position temporally later than its original position before time interleave processing. In addition, signals of symbols included in carrier waves different in frequency are included in temporally different positions in the signal after rearrangement, respectively. Thus, even when a burst error arises in which errors concentrate temporally, error correction by decode processing by the decoders is possible because the errors are dispersed after time deinterleave processing.

In byte interleave processing on the transmission side, a signal is rearranged in unit of byte such that data is dispersed in unit of 204 bytes of RS-encoding. In bit interleave processing, a signal is rearranged in unit of bit. In frequency interleave processing, symbols are rearranged between a plurality of carrier waves included in an OFDM signal Si. Restoration to the data before interleaving is performed by the byte, bit, and frequency deinterleave processing on the reception side.

The decoders that decode the digital signal sent from the wave equalizing section 37, include a Viterbi decoder 46 and an RS decoder 49. The digital signal that was Viterbi- and RS-encoded on the transmission side, is dispersed in its errors by the deinterleaving processing as described above; it is restored by the Viterbi decoder 46 and the RS decoder 49 to the digital signal before encoding; and thereby errors generated due to transmission and so on are corrected. The energy reverse dispersing section 48 restores the digital signal sent from the wave equalizing section 37, to the digital signal before energy dispersion.

Of the decoders, the Viterbi decoder 46 that decodes the Viterbi-encoded signal will be described in more detail. To each data of the Viterbi-encoded signal, data has been added that is dependent on the arrangement of one or more data precedent to the above data. The Viterbi decoder 46 extracts a data string in which a predetermined number of data constituted by data input at a certain time point and data input antecedent to that data, are successive. The Viterbi decoder 46 compares the extracted data string with a plurality of data strings each constituted by the same number of data arranged in an order that is considered to be consistent with the extracted input data string. When the input data string includes therein no errors, the data string coincides in the data arrangement order with one of the plurality of data strings cited as candidates. However, when the input data string includes therein errors, any of bits of the data string has been inversed and thus it does not coincide with any of the plurality of data strings cited as candidates. Therefore, one of the plurality of data strings in which the number of inversed bits, that is, the Humming distance, is small in comparison with the input data string, is supposed to be the most probable, and the input data string is corrected into the supposed data string.

The hard decision of Viterbi coding was described in the above. In general, however, in order to further improve the performance, the soft decision using the reliability of data is used though it increases the quantity of operation and the capacity of memory. In the soft decision used in the communication field, the reliability is set in accordance with in what degree the phase and intensity of demodulated data on each carrier wave have shifted from their original positions, and the probability of a data string is supposed with being reflected on the Humming distance of each data, irrespective of existence of errors.

As described above, in accordance with reception conditions and so on, reliability is set in advance to each data in the data string input to the Viterbi decoder 46. The Viterbi decoder 46 calculates the Humming distance on the basis of the reliability to improve the error correction performance.

As described before, the convolution coding method is a method of coding from the history of precedent data. Thus, in the Viterbi decoder 46 that decodes a signal having been encoded by the convolution coding, the error correction performance is more improved as the trace back length, which is the number of data to be referred to with tracing back, is larger. Thus, the Viterbi decoder 46 may be constructed so as to change its error correction performance by changing the trace back length on the basis of the reliability. That is, when the reliability is high, i.e., the signal status is good, the trace back length is decreased to decrease the quantity of operation of decode processing and so on and thereby reduce the power consumption. Contrastingly, when the reliability is low, i.e., the signal status is bad, the trace back length is increased so that errors can be corrected more surely.

In the case that the Viterbi decoder 46 that decodes a signal having been encoded by the convolution coding, uses the soft decision in which the reliability of data is reflected, the error correction performance is higher than the case of using the hard decision in which the reliability is not reflected. Thus, the Viterbi decoder 46 may be constructed so as to change its error correction performance by switching between the hard decision as a first decoding mode and the soft decision as a second decoding mode on the basis of the reliability of the input signal Si. That is, when the signal status is good and the reliability is high, the hard decision is selected in which the Humming distance is not calculated based on the reliability, to decrease the quantity of operation of decode processing and so on and thereby reduce the power consumption. Contrastingly, when the signal status is bad and the reliability is low, the soft decision is selected in which the Humming distance is calculated based on the reliability, so that errors can be corrected more surely though the power consumption increases.

Various kinds of deinterleaving, decoding, and energy reverse dispersing, as described above, are performed in the reverse order to the order in which various kinds of interleaving, encoding, and energy dispersing, were performed on the transmission side. That is, as shown in FIG. 5, frequency deinterleaving, time deinterleaving, bit deinterleaving, Viterbi decoding, byte deinterleaving, energy reverse dispersing, and RS decoding, are performed in this order.

Next, the demodulation controlling unit 41 will be described. The demodulation controlling unit 41 receives an instruction of the controller 4 to control the operations of a plurality of circuit elements that constitute the demodulating unit 40. In this embodiment, the demodulation controlling unit 41 may be a part constituted by circuits specialized so as to carry out the respective functions; or may include general-purpose CPU, ROM, RAM, etc., and may be constructed so as to carry out the respective functions by causing the CPU to execute a program recorded in the ROM. In this embodiment, a "circuit element" is not limited to a circuit such as the ADC section 31, the error correcting section 36, or the like, of the demodulating unit 40 as described above. The "circuit element" can correspond to any unit of part, for example, a part equivalent to one transistor constituting such a circuit as described above.

The demodulation controlling unit 41 outputs information on the intensity of the IF signal to an AGC controller that controls the gains of the RF amplifier section 21 and the IF amplifier section 25 of the tuner 2, as shown in FIG. 3, such that the IF signal input from the tuner 2 to the demodulating unit 40 is kept constant in intensity.

Next, the controller 4 will be described. The controller 4 includes therein a CPU, a ROM, a RAM, etc., and is constructed so as to perform various controls to the operation of each circuit element of the tuner 2 and the demodulator 3 by causing the CPU to execute various programs recorded in the ROM. For example, the controller 4 controls the power consumption of each of the RF amplifier section 21, the mixer section 22, the VCO-PLL section 23, the filter section 24, and the IF amplifier section 25 of the tuner 2, so as to decrease the power consumption of the whole of the digital demodulating apparatus 1. Or, the controller 4 controls the AGC controller that sets the gains of the RF amplifier section 21 and the IF amplifier section 25, to make the IF signal constant in intensity.

Figure 7:
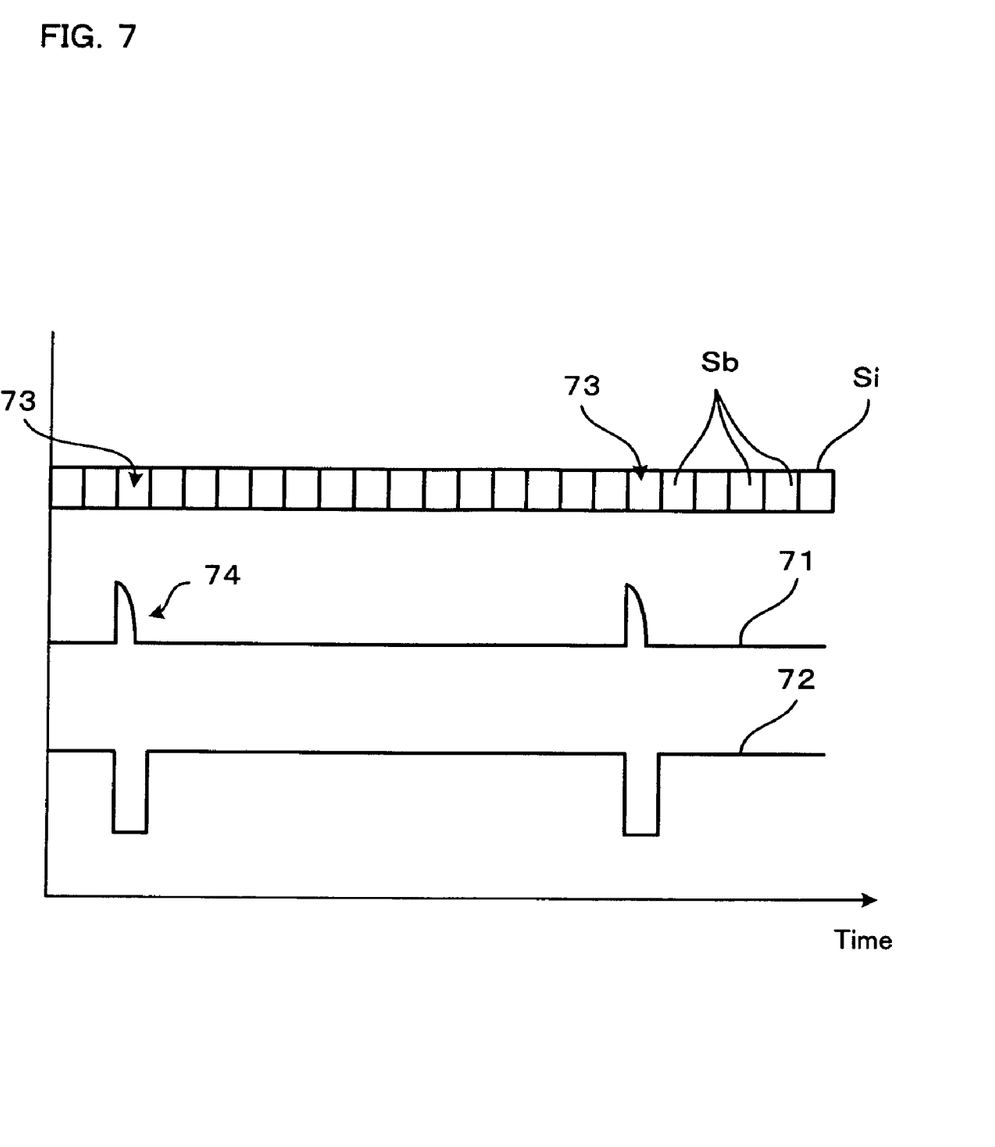
FIG. 7 is a timing chart showing affection on a received signal, of a control by a controller shown in FIG. 2.

Such a control of the controller 4 may cause generation of noise or an increase in noise in the IF signal Si. FIG. 7 is a timing chart showing affection of a control of the controller 4 on the IF signal Si. A curved line 71 represents the intensity of noise generated due to the control of the controller 4. The curved line 71 shows generation of noise 74 or an increase in noise 74 on two symbols 73 of symbols Sb included in the IF signal Si.

To take the affection of the noise into consideration, a CN ratio as shown by the following Expression 1 is used. In the Expression 1, Cd and Nd represent electric powers of a carrier wave and noise per one symbol.

$$(CNratio) = 10\log\left(\frac{C_d}{N_d}\right) \qquad \text{[Expression 1]}$$

The electric power Nd of noise in the Expression 1 includes the electric power Ni of noise generated or increased due to the control of the controller 4; and the electric power No, other than Ni, which is obtained by summing the electric power of noise included in the received signal Sr and the electric power of noise generated after the tuner 2 received the signal Sr till the tuner 2 converted the signal Sr into the IF signal Si. Thus, the CN ratio of a symbol 73 including the noise 74 shown by the curved line 71 of FIG. 7 is given by the following Expression 2.

$$(CNratio) = 10\log\left(\frac{C_d}{N_o + N_i}\right) \qquad \text{[Expression 2]}$$

In FIG. 7, a curved line 72 represents the CN ratio of the signal Sr obtained by the Expression 2. In the below description, if not otherwise specified, it is assumed that there is no temporal change in noise generated till the tuner 2 receives the signal Sr, and thus the reception is stable in condition. Therefore, the CN ratio represented by the curved line 72 drops in the range of the symbol 73 due to the noise 74 and is kept at a certain value in the other ranges.

As for a symbol whose CN ratio has been lowered due to the control of the controller 4, in accordance with the degree of worsening of the signal status, for example, in the case that the symbol has been broken substantially completely, the data of that portion may be unable to be taken out. In such a case, it is useless that the demodulating unit 40 performs the same demodulation processing as that for a symbol in the normal signal status. For this reason, the digital demodulating apparatus 1 of this embodiment is constructed so that the signal status can be forecasted that is under the assumption that the controller 4 performs a predetermined control, and the demodulation controlling unit 41 can control each part of the demodulating unit 40 so as to decrease the performance of demodulation processing to a portion in which the signal status has been worsened, and thereby decrease the power consumption of the demodulator 3.

Figure 8:
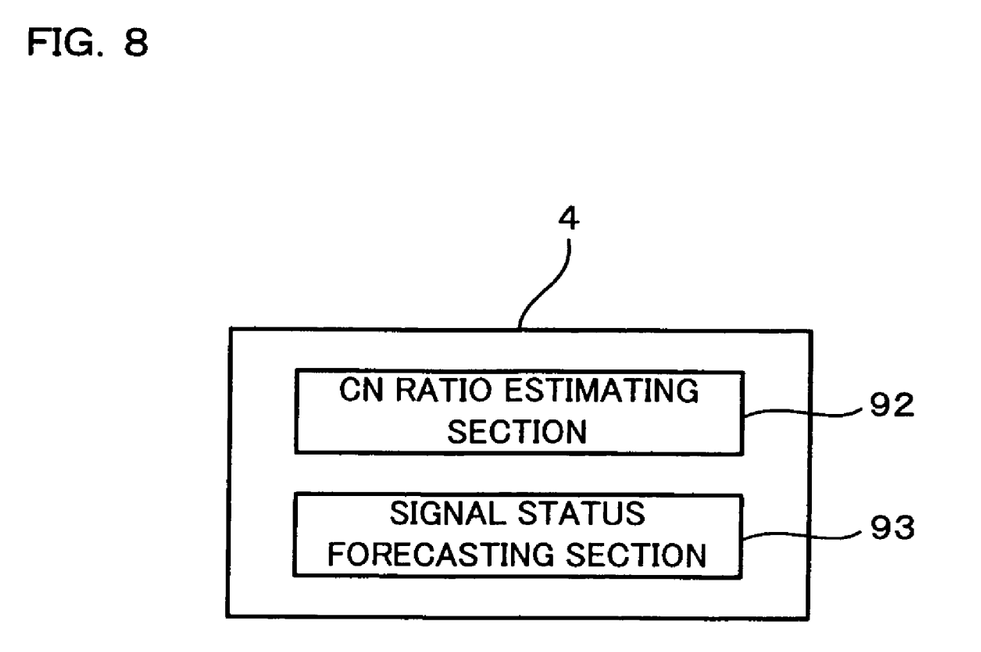
FIG. 8 is a block diagram showing a construction of the controller.

As shown in FIG. 8, the controller 4 includes therein a CN ratio estimating section 92 and a signal status forecasting section 93.

The CN ratio estimating section 92 first estimates the quantity of hypothetical noise to be generated in the signal Si under the assumption that the controller 4 controls the operation of each circuit element of the tuner 2 and the demodulator 3. The quantity of hypothetical noise is derived from the circuit element to be controlled by the controller 4, the quantity of the control, and so on. Or, the quantity Ni of noise to be generated may be obtained from a function of those parameters and the quantity of noise. The CN ratio estimating section 92 then calculates the CN ratio given by the Expression 2 as described above, from the estimated noise quantity Ni and information on CN ratio sent from the wave equalizing section 37.

On the basis of the hypothetical CN ratio estimated by the CN ratio estimating section 92, the signal status forecasting section 93 forecasts the signal status of the received signal under the assumption that the controller 4 performs a predetermined control. More specifically, the signal status forecasting section 93 holds a predetermined threshold of CN ratio, for example, CN ratio=4.5 dB. When the CN ratio estimated by the CN ratio estimating section 92 is not more than the threshold, the signal status forecasting section 93 decides that the signal status of that portion is worsened to a predetermined status, for example, a status in which the symbol has been broken substantially completely. The predetermined threshold of CN ratio varies in accordance with the carrier modulating method or the like of the received signal, such as 64 QAM, 16 QAM, and QPSK. For this reason, the signal status forecasting section 93 holds therein a table that shows the relation between the carrier modulating method or the like and various thresholds. The signal status forecasting section 93 obtains a proper threshold on the basis of the table and information on the carrier modulating method or the like.

Afterward, the controller 4 performs a predetermined control to each circuit element of the tuner 2 and the demodulator 3. At this time, if the signal status forecasting section 93 has decided that the control of the controller 4 causes the signal status of part of the received signal to be worsened, the controller 4 sends, to the demodulation controlling unit 41, information on a region of symbols, in which the signal status has been worsened, from the time of the control till the affection of the control decreases. When the demodulation controlling unit 41 as an operation controlling section controls a plurality of circuit elements that constitute the demodulator 40, in the region in which the signal status has been worsened, the demodulation controlling unit 41 controls the operation of at least one of the plurality of circuit elements such that the performance decreases.

The performance decrease control of the demodulation controlling unit 41 will be described more specifically. At a timing of processing a portion in which the signal status was expected to be worsened, the demodulation controlling unit 41 decreases the power supply to decrease the performance of the ADC section 31, for example, to decrease the resolution in the number of bits or the sampling frequency of the ADC section 31. Or, the demodulation controlling unit 41 may turn the power of the ADC section 31 off.

Further, the demodulation controlling unit 41 stops processing to the received signal in a unit of symbol in which the signal status was expected to be worsened, to at least one of the digital circuits such as the FFT section 33 that performs processing to the digital signal converted by the ADC section 31, for example, by turning the power off.

First, in the AFC-symbol synchronizing section 32, symbol synchronization processing is stopped because normal data can not be input from the ADC section 31. At this time, the status immediately before stopping the symbol synchronization processing is held in order to prevent adverse effects on data before and after stopping. For example, in the case that the AFC-symbol synchronizing section 32 determines a symbol synchronization point by referring to correlation of the signal, the self correlation calculation is stopped, and information on symbol synchronization point is held to the previous status. In addition, FFT processing in the FFT section 33 is stopped. Further, frame synchronization processing in the region of that symbol by the frame synchronizing section 34. At this time, on the basis of the frame synchronization processing that has been performed, it is judged whether or not that symbol is a frame separator. On the basis of the result of the judgment, processing is performed to the next or later symbol on the assumption that frame synchronization processing is not stopped.

When FFT processing is being stopped, accurate symbol data can not be extracted. Even when FFT processing is not being stopped, stopping processing other than the FFT processing, for example, symbol synchronization processing, makes it impossible to extract accurate symbol data. In this case, because TMCC information on that symbol is in error, detection processing in the detecting section 35, that is, taking out the TMCC information, is stopped in that symbol. On the basis of TMCC data on the corresponding symbol in the previous frame, the TMCC information on that symbol is held or reproduced. In addition, wave equalization processing in the wave equalizing section 37 is stopped. In this embodiment, in the case that filter processing or average processing is performed by temporally using a scattered pilot signal to perform equalization processing in order to decrease affection of noise, information on the symbol in which the signal status has been worsened is not used for the filter processing or the average processing so as to prevent adverse effect on symbols before and after stopping the equalization processing. Further, frequency deinterleave processing in the frequency deinterleaving section 43 is stopped.

As described above, the demodulation controlling unit 41 stops processing to the digital circuits from the AFC-symbol synchronizing section 32 to the frequency deinterleaving section 43, in a unit of symbol in which the signal status has been worsened. This decreases the quantity of unnecessary operation in each digital circuit to decrease the power consumption.

As described above, the demodulation controlling unit 41 outputs information on the intensity of IF signal to the AGC controller that controls the gains of the RF amplifier section 21 and the IF amplifier section 25 of the tuner 2. When the above-described control is performed, however, the information on IF signal is in error. Thus, when the control is performed, the demodulation controlling unit 41 holds information on the symbol before the control, and outputs the information to the AGC controller.

When a symbol in which the signal status is expected to be normal is input after the above-described performance decrease control was performed, the demodulation controlling unit 41 sets the power supply to the ADC section 31 back to the original state; restores each digital circuit; and performs normal processing to the received signal.

When the demodulation controlling unit 41 performed power decrease control to the ADC section 31 and controls to stop processing to the digital circuits after the ADC section 31, data is not output from the frequency deinterleaving section 43 to the time deinterleaving section 44 and thus normal time deinterleave processing can not be performed. In this embodiment, therefore, as shown in FIG. 5, a dummy signal generating section 50 is provided in the demodulating unit 40. The dummy signal generating section 50 supplies a dummy signal to the time deinterleaving section 44 in place of the received signal when processing to each digital circuit is stopped in a unit of symbol. The dummy signal generating section 50 receives an instruction from the demodulation controlling unit 41 and outputs a dummy signal to the time deinterleaving section 44 in place of the symbol in which the signal status has been worsened. More specifically, when power control is performed to the ADC section 31, the dummy signal generating section 50 outputs a dummy signal to the time deinterleaving section 44 in accordance with a clock being output from the ADC section 31.

As described above, a reliability has been set in advance on the basis of the reception condition or the like to each data of a data string input to the Viterbi decoder 46, and the Viterbi decoder 46 changes the error correction performance on the basis of the reliability. However, when the demodulation controlling unit 41 performs the above-described control, an erroneous signal as a dummy signal is input to the Viterbi decoder 46 irrespective of the set reliability. This may decrease the error correction performance of the Viterbi decoder 46.

For this reason, the dummy signal generating section 50 sets the reliability of the dummy signal to the lowest value. In this case, when the dummy signal is input, the Viterbi decoder 46 performs error correction on the basis of a signal other than the dummy signal by calculating the Humming distance on the assumption that the reliability of the input signal is the lowest. This can improve the error correction performance. Further, when the dummy signal is input, the Viterbi decoder 46 increases its error correction performance by increasing the trace back length. This makes it possible to more accurately correct errors of input signals including the dummy signal.

Figure 9:
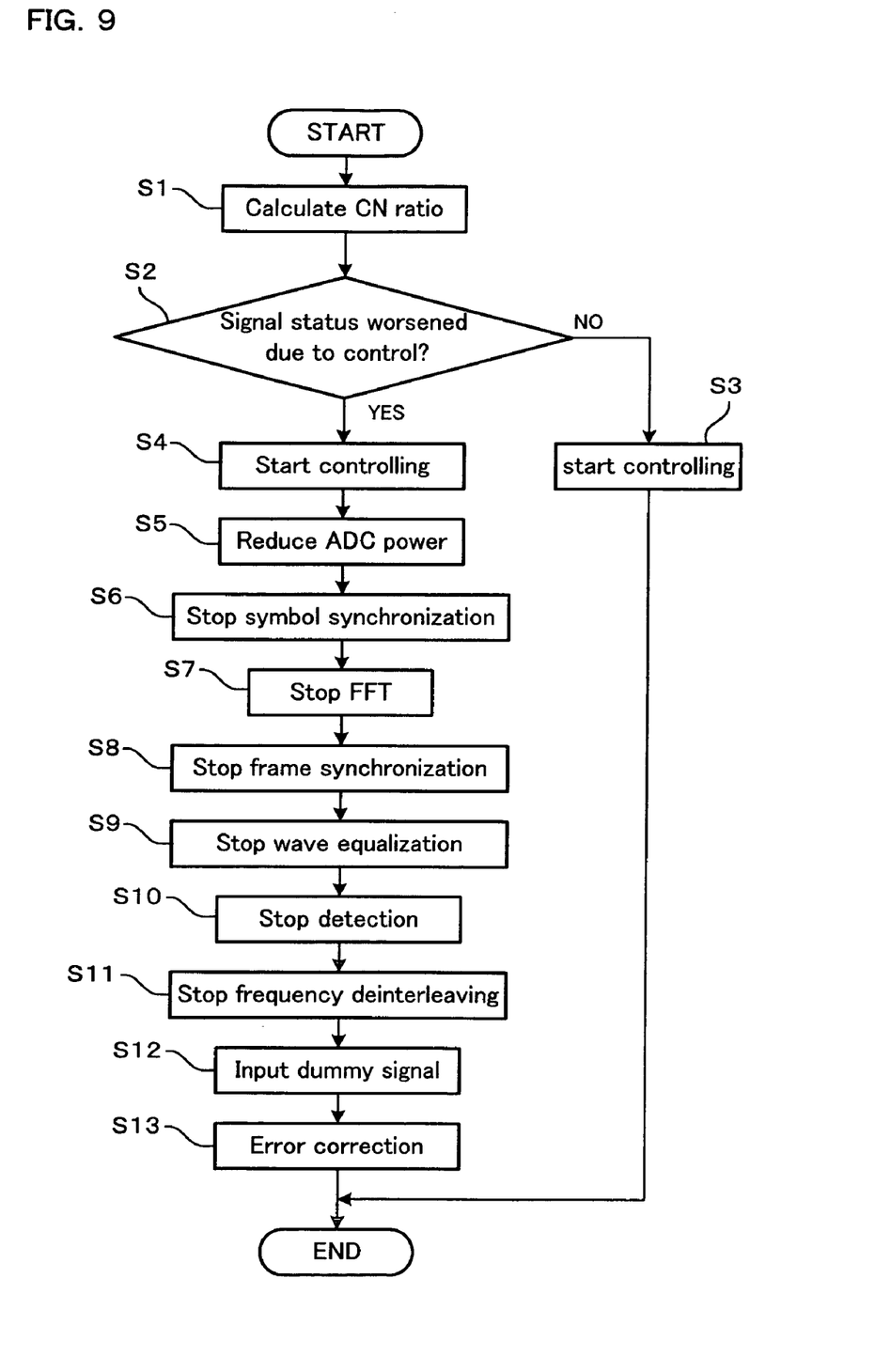
FIG. 9 is a flowchart showing a series of procedures including a performance decrease control of a circuit element that constitutes the demodulating unit.

Next, a series of procedures including the performance decrease control of the demodulating unit 40 by the demodulation controlling unit 41 when the controller 4 performs a predetermined control, will be described with reference to a flowchart of FIG. 9. In FIG. 9, Sn (n=1, 2, 3, ...) represents a step number.

First, in Step S1, the CN ratio estimating section 92 calculates a hypothetical CN ratio from the quantity Ni of hypothetical noise to be generated in the signal Si when it is assumed that the controller 4 controls each circuit element of the tuner 4 and the demodulator 3, and information on CN ratio sent from the wave equalizing section 37. Next, in a signal status forecasting step of Step S2, on the basis of the CN ratio estimated by the CN ratio estimating section 92, the signal status forecasting section 93 forecasts a signal status of the received signal when it is assumed that the controller 4 performs a predetermined control.

When it has been forecasted that the signal status of the received signal is not worsened to a predetermined status, for example, the CN ratio=4.5 dB, that is, NO in Step S2, the flow advances to Step S3, in which the controller 4 performs the predetermined control and the demodulation controlling unit 41 does not perform the performance decrease control of the demodulating unit 40. On the other hand, when it has been forecasted that the signal status of the received signal is worsened to the predetermined status, that is, YES in Step S2, the flow advances to Step S4, in which the controller 4 performs the predetermined control, and thereafter the demodulation controlling unit 41 performs the performance decrease control of the demodulating unit 40 as in an operation control step.

First, in Step S5, at a timing of processing a portion in which the signal status was expected to be worsened, the electric power of the ADC section 31 is decreased to decrease the resolution or the sampling frequency and thus decrease the performance of the ADC section 31, or the ADC section 31 is stopped by turning the power off. Next, processing to the following digital circuits is stopped in a unit of symbol in which the signal status is worsened. That is, symbol synchronization processing in the AFC-symbol synchronizing section 32, FFT processing in the FFT section 33, and frame synchronization processing in the frame synchronizing section 34, are stopped in Steps S6, S7, and S8, respectively. In Step S9, wave equalization processing in the wave equalizing section 37 is stopped. In Step S10, detection processing in the detecting section 35, that is, taking out TMCC information, is stopped. In Step S11, frequency deinterleave processing in the frequency deinterleaving section 43 is stopped. In Step S12, a dummy signal in a unit of symbol, the reliability of which has been set to be the lowest, is input to the time deinterleaving section 44 in place of the received signal that is not sent due to the above-described controls. In Step S13, the Viterbi decoder 46 performs error correction on the basis of the reliability of the input signal.

The above-described digital demodulating apparatus 1 brings about the following effects.

When the status of the received signal is forecasted to be worsened due to a predetermined control of the controller 4, the demodulation controlling unit 41 controls the operation of each circuit element that constitutes the demodulator 3, such that the performance of the operation of the element decreases. That is, when the status of the received signal is worsened due to the control of the controller 4, the performance of demodulation processing to the portion in which the status has been worsened, is decreased. This can reduce the power consumption of the demodulator 3.

Next, various modifications of the above-described embodiment will be described. In the modifications, each component having the same construction as in the embodiment may be denoted by the same reference numeral as in the embodiment to omit the description.

(1) In the above embodiment, an example is described in which the signal status of one symbol is worsened due to a control of the controller 4, as shown in FIG. 7. When the signal statuses of successive two or more symbols are worsened, the demodulation controlling unit 41 controls the operation of each circuit element that constitutes the demodulator, such that the performance of the operation of the element decreases, in the two or more symbols.

(2) In the above embodiment, the controller 4 is provided outside the tuner 2 and the demodulator 3. However, each part having each function of the controller 4 may be provided inside the tuner 2 or the demodulator 3. Or, the controller 4 may be constructed by a host CPU that controls the digital receiver such as a cellular phone including therein the digital demodulating apparatus 1 of the embodiment, and a computer program that causes the CPU to function. In addition, the demodulation controlling unit 41 may not be provided in the demodulator 3, and it may be provided outside the demodulator 3.

(3) In the above embodiment, the performance decrease control of the demodulator 3 is described by using an example in which the signal status of the received signal is worsened when the controller 4 of the digital demodulating apparatus 1 controls each circuit element of the tuner 2 and the demodulator 3. However, when a host CPU as a controller that controls the whole of a digital receiver such as a cellular phone, controls each section of the receiver, the status of the received signal may be worsened. For example, when the cellular phone has transmitted a signal to give positional information to the external, the signal status of a signal to be received may be worsened because the transmitted signal serves as a interference signal with the signal to be received. Even in such a case, like the above embodiment, by controlling the operation of each circuit element that constitutes a demodulator, such that the performance of the operation of the element decreases, the power consumption of the demodulator can be decreased.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A digital demodulating apparatus comprising:
   a tuner that performs channel select processing to a received signal;
   a demodulator that performs demodulation processing to the received signal from the tuner;
   a controller that controls the tuner and the demodulator;
   a signal status forecasting section that, when a predetermined control is to be performed by the controller, forecasts a change in signal status attributed to the predetermined control prior to the controller performing the predetermined control, based on a type of the predetermined control; and
   an operation controlling section that, when the signal status forecasting section has forecasted that the signal status is to be worsened to a predetermined status due to the predetermined control, controls demodulation processing of at least one of a plurality of circuit elements that constitute the demodulator, such that a performance of the demodulation processing decreases in processing a portion of the received signal in which the signal status has been forecast as worsened.

2. The apparatus according to claim 1, wherein the apparatus comprises a CN ratio estimating section that estimates a CN ratio of the received signal when it is assumed that the controller performs the predetermined control, and
   the signal status forecasting section decides that the signal status is to be worsened to the predetermined status, when the CN ratio estimated by the CN ratio estimating section is not more than a predetermined threshold.

3. The apparatus according to claim 1, wherein the demodulator comprises an AD converting section that converts the received signal, which is an analogue signal, into a digital signal, and
   the operation controlling section controls an operation of the AD converting section by decreasing an electric power to be supplied to the AD converting section.

4. The apparatus according to claim 3, wherein the operation controlling section decreases the electric power so as to decrease a resolution of the AD converting section.

5. The apparatus according to claim 3, wherein the operation controlling section decreases the electric power so as to decrease a sampling frequency of the AD converting section.

6. The apparatus according to claim 1, wherein the demodulator comprises an AD converting section that converts the received signal, which is an analogue signal, into a digital signal, and a plurality of digital circuits that process digital signals from the AD converting section, and
   the operation controlling section stops processing to the received signal in at least one of the plurality of digital circuits in a unit of symbol in which the signal status forecasting section has forecasted that the signal status is to be worsened.

7. The apparatus according to claim 6, wherein the operation controlling section stops processing to the received signal in one of a symbol synchronizing section, an FFT section, a frame synchronizing section, a detection section, a wave equalizing section, and a frequency deinterleaving section.

8. The apparatus according to claim 7, wherein the received signal has been interleaved, and
   the apparatus comprises an error correcting section that performs deinterleaving processing to the interleaved received signal, and corrects errors included in the deinterleaved received signal.

9. The apparatus according to claim 8, wherein the error correcting section comprises a time deinterleaving section that performs time deinterleave processing to the received signal, and
   the apparatus comprises a dummy signal generating section that outputs a dummy signal to the time deinterleaving section in place of the received signal when processing to the received signal is stopped in at least one of the plurality of digital circuits, in a unit of symbol in which the signal status forecasting section has forecasted that the signal status is to be worsened.

10. The apparatus according to claim 9, wherein the error correcting section changes its error correction performance on the basis of a reliability of the input signal.

11. The apparatus according to claim 10, wherein the dummy signal generating section sets the reliability of the dummy signal to a lowest value.

12. The apparatus according to claim 10, wherein the error correcting section comprises a decoder that decodes the received signal that has been encoded by convolution coding.

13. The apparatus according to claim 12, wherein the decoder changes a trace back length on the basis of the reliability of the input signal.

14. The apparatus according to claim 12, wherein the decoder can select one of a first decoding mode in which decoding is performed without reflecting the reliability of the input signal, and a second decoding mode in which decoding is performed with reflecting the reliability, and
   the decoder switches its mode between the two decoding modes on the basis of the reliability.

15. A digital receiver comprising a digital demodulating apparatus comprising:
   a tuner that performs channel select processing to a received signal;
   a demodulator that performs demodulation processing to the received signal from the tuner;
   a controller that controls the tuner and the demodulator;
   a signal status forecasting section that, when a predetermined control is to be performed by the controller, forecasts a change in signal status attributed to the predetermined control prior to the controller performing the predetermined control, based on a type of the predetermined control; and an operation controlling section that, when the signal status forecasting section has forecasted that the signal status is to be worsened to a predetermined status due to the predetermined control, controls demodulation processing of at least one of a plurality of circuit elements that constitute the demodulator, such that a performance of the demodulation processing decreases in processing a portion of the received signal in which the signal status has been forecast as worsened, the receiver performing reproduction processing for at least one of character data, image data, audio data, and program data, on the basis of the received signal demodulated by the digital demodulating apparatus.

16. A digital receiver comprising a digital demodulating apparatus comprising a tuner that performs channel select processing to a received signal, and a demodulator that performs demodulation processing to the received signal from the tuner, the receiver further comprising:
a controller that controls the whole of the receiver including the digital demodulating apparatus,
a signal status forecasting section that, when a predetermined control is to be performed by the controller, forecasts a change in signal status attributed to the predetermined control prior to the controller performing the predetermined control, based on a type of the predetermined control; and
an operation controlling section that, when the signal status forecasting section has forecasted that the signal status is to be worsened to a predetermined status due to the predetermined control, controls demodulation processing of at least one of a plurality of circuit elements that constitute the demodulator, such that a performance of the demodulation processing decreases in processing a portion of the received signal in which the signal status has been forecast as worsened.

17. A controlling method of a digital demodulating apparatus comprising a tuner that performs channel select processing to a received signal; a demodulator that performs demodulation processing to the received signal from the tuner; and a controller that controls the tuner and the demodulator, the method comprising:
a signal status forecasting step of, when a predetermined control is to be performed by the controller, a processor forecasting a change in signal status attributed to the predetermined control prior to
the controller performing the predetermined control, based on a type of the predetermined control; and
an operation controlling step of, when it was forecasted in the signal status forecasting step that the signal status is worsened to a predetermined status due to the predetermined control,
controlling demodulation processing of at least one of a plurality of circuit elements that constitute the demodulator, such that a performance of the demodulation processing decreases in processing a portion of the received signal in which the signal status has been forecast as worsened.

18. A non-transitory computer-readable medium having instructions stored thereon for a digital demodulating apparatus comprising a tuner that performs channel select processing to a received signal; a demodulator that performs demodulation processing to the received signal from the tuner; and a controller that controls the tuner and the demodulator, wherein when the instructions are read and executed by a processor, the processor is configured to perform the steps of:

a signal status forecasting step of, when a predetermined control is to be performed by the controller, forecasting a change in signal status attributed to the predetermined control prior to the controller performing the predetermined control, based on a type of the predetermined control; and
an operation controlling step of, when it was forecasted in the signal status forecasting step that the signal status is to be worsened to a predetermined status due to the predetermined control, controlling demodulation processing of at least one of a plurality of circuit elements that constitute the demodulator, such that a performance of the demodulation processing decreases in processing a portion of the received signal in which the signal status has been forecast as worsened.

* * * * *